Figure 1:
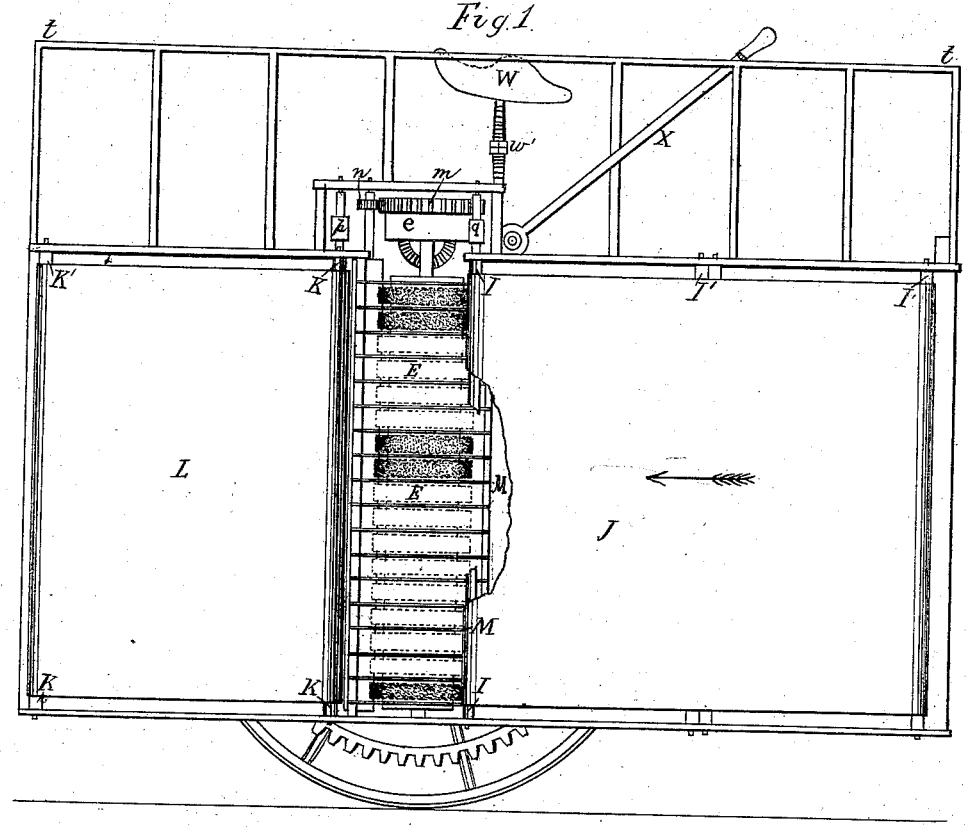

2 Sheets—Sheet 1.

G. BEEKMAN.
Cotton-Picking Machine.

No. 227,949. Patented May 25, 1880.

Witnesses.
A. B. Robertson
W. W. Hollingsworth

Inventor
Gerard Beekman
By T. J. W. Robertson
Attorney.

G. BEEKMAN.
Cotton-Picking Machine.
No. 227,949.  Patented May 25, 1880.
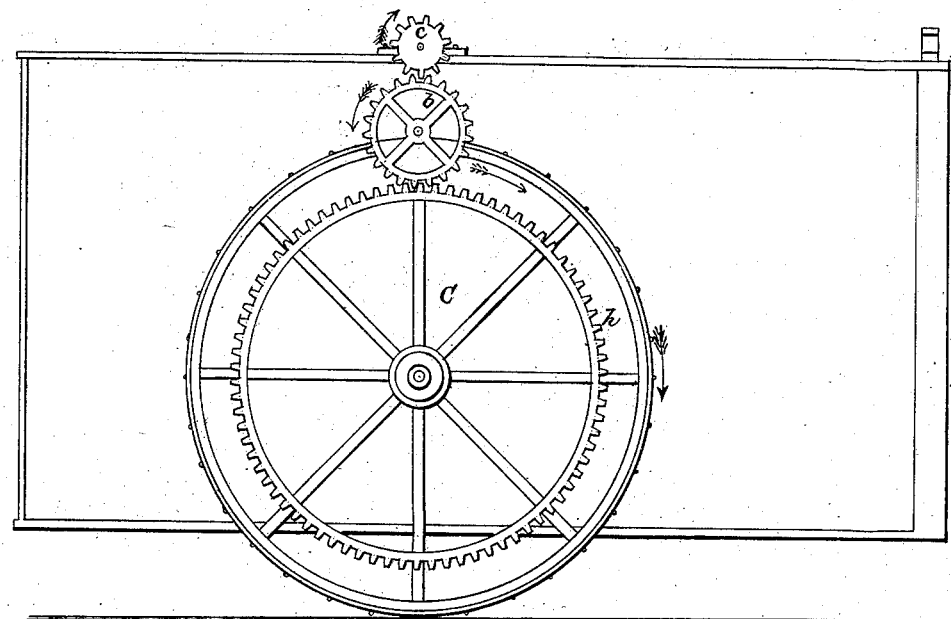
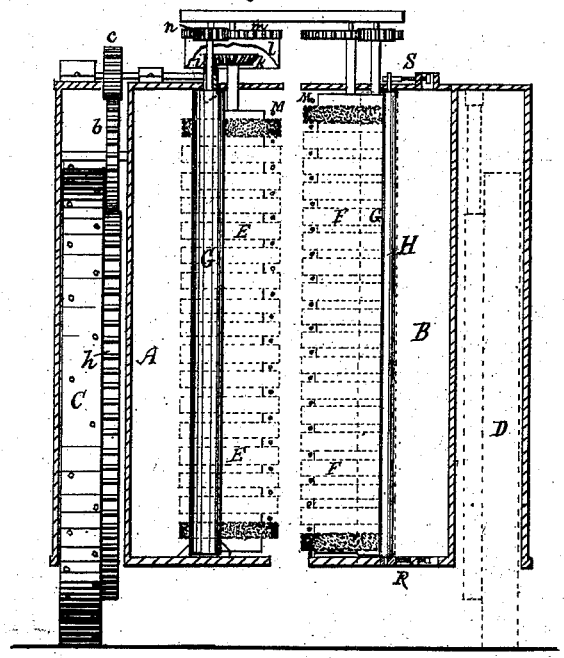
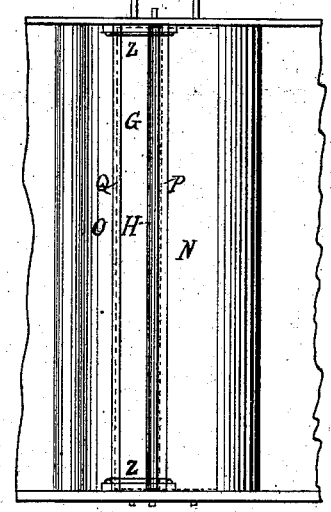
Witnesses
A. B. Robertson
W. W. Hollingworth
Inventor
Gerard Beekman
By T. J. W. Robertson
Attorney

UNITED STATES PATENT OFFICE.

GERARD BEEKMAN, OF NEW YORK, N. Y., ASSIGNOR OF ONE-HALF OF HIS RIGHT TO J. WILLIAM BEEKMAN, OF SAME PLACE.

COTTON-PICKING MACHINE.

SPECIFICATION forming part of Letters Patent No. 227,949, dated May 25, 1880.

Application filed June 5, 1878.

*To all whom it may concern:*

Be it known that I, GERARD BEEKMAN, of the city of New York, have invented a new and useful Machine for Picking Cotton, which is fully set forth in the following specification, reference being had to the accompanying drawings.

The object of my invention is to pick from the cotton-plant, while growing, all the cotton in the ripe bolls, leaving the unripe bolls and the leaves and stems of the plant uninjured. For this purpose I construct a machine upon two wheels in such form that when driven along a row of cotton-plants one part of the machine will be upon each side of the row of plants, and between these two parts each plant in succession will, with a minimum of friction, be spread out, so that as it passes certain revolving pickers all the cotton in the ripe bolls will be reached by the pickers and extracted. The revolving pickers I construct of or cover with a material that will catch and draw away all the fibers of cotton, but will do no injury to the unripe bolls, leaves, and stems.

The machine is illustrated more in detail in the drawings, in which—

Figure 2:
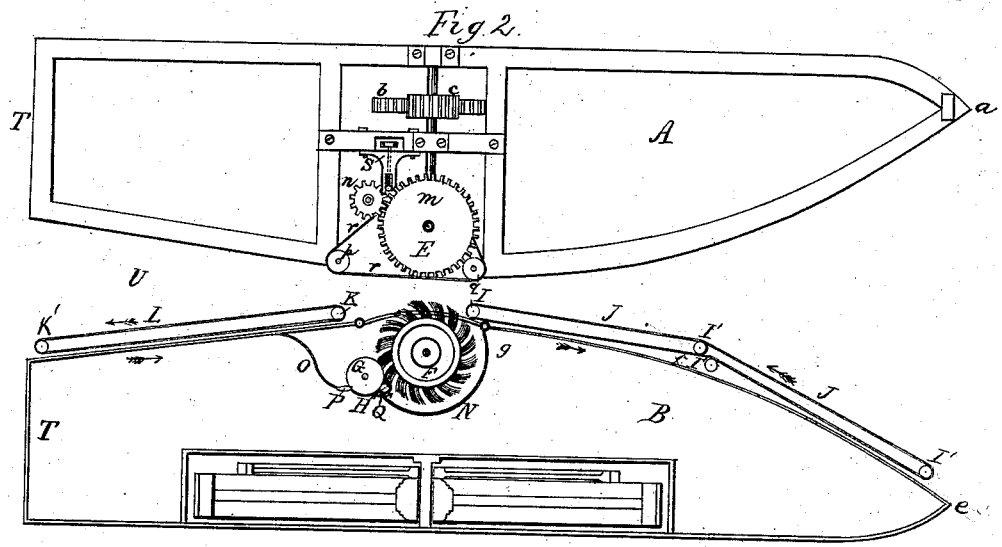

Figure 1 is a side elevation of one-half of the machine as seen from the channel-way, showing the picking-burr and guards. Fig. 2 is a top view of the machine, showing in the part A the driving mechanism only, and in the part B the arrangement of the picking-burr and rollers only. Fig. 3 is a side elevation, showing the connection of the driving mechanism with the wheels upon which the machine moves. Fig. 4 is an end view from the rear, showing the cleaning-rollers and the means of adjustment. Fig. 5 is a side view of the cleaning-rollers and shields as seen from the inside of the bin B.

I am aware that cotton-harvesters have heretofore been made with a channel-way having a V-shaped mouth for the entrance of the plants. Such channel-ways have been made sufficiently wide for the plant to pass through easily without assistance.

My machine, however, acts upon a different principle from these, all of which have strong picking-teeth projecting so as to reach the cotton in the middle of the bush. In my machine it is essential that the channel-way be very narrow, in order to compress the cotton-plant to such an extent that the ripe cotton will project beyond the branches and leaves of the plant on both sides, so as to come in contact with the burrs hereinafter described. Although I do not limit myself to a channel-way of any particular width, yet the plant should be compressed into the narrowest space possible without injury. With the belting on each side of the channel-way an ordinary cotton-plant will pass through a space from one to two inches in width without injury, while without the belting it would be broken or torn up by the roots.

A B are the two receiving-bins or parts of the machine between which the plants are spread out in passing through the channel-way V U. These bins are rigidly connected together only at the top, and the distance between them may be varied by screws or any suitable mechanism, the channel-way between them being open at the bottom. The points $a$ and $e$ are the forward ends of the machine, between which the plants first pass into the V-shaped mouth V. C D, Fig. 4, are the wheels upon which the machine moves and which impart motion to the mechanism, which is the same in each side of the machine. These wheels are opposite to and parallel with one another, and at such distance apart that they will travel in about the middle of adjoining furrows between the rows of cotton-plants. They are upon different axles, and the mechanism connected with the one is entirely separate from the mechanism connected with the other.

E F are the picking-burrs. G H G H are pairs of cleaning-rollers. I I′ are rollers around or upon which pass the endless beltings J J, one on each side of the mouth V, and K K′ are rollers around which pass in like manner the two endless beltings L L, at the rear end of the machine.

When the machine is moved forward, the plants enter the V-shaped mouth between $a$ and $e$, Fig. 2, and are gradually compressed between the parts A B until they are spread out like a fan when reaching the picking-burrs E F, and thus every boll comes in contact with the picking-burrs while passing. In order to prevent friction upon the plant the rollers I I are made to revolve in such manner that the belting J J will move in the direction shown by the arrows with approximately the same speed as that at which the machine is moving over the ground, or a little more rapidly, this being easily accomplished by connections with the wheels upon which the machine moves. The plants are thus spread out like a fan, without appreciable rubbing.

The belting may be made of leather, or cotton, or bagging, or other suitable material, and may be stiffened by vertical rods or strips of material.

The belting may also be made without connection with the driving-power, but moving so readily upon the rollers that the plants in their passage will carry it backward, and thus avoid much friction. The inner sides of the machine or of the bins A B are curved from $a$ to $f$, and from $e$ to $g$, so that the side pressure is gradually lessened as the plant becomes more and more flattened. So, likewise, the inner sides of the bins A B may be curved on each side between the rollers K K', around which passes the belting L. The exit at the rear of the machine may, however, have sides nearly or quite parallel, in order to allow more space for the bins.

At the place where the inner sides of the bins A B most nearly approach one another—namely, between the endless belts J and L, on each side of the machine—are apertures through which the picking-burrs project, so as to reach the bolls. The said apertures extend from the top to the bottom of the bins, and are of sufficient width to admit the passage of the picking-burrs, and across the said apertures pass any suitable number of rods or bands M, acting as a fence or screen to hold the plants while the cotton is being stripped off, and to prevent the plants from passing through the apertures with the cotton extracted from the bolls.

I prefer to have the picking-burrs revolve, so as to act as hooks to catch the cotton fibers with their elastic points, and so that their inner surfaces move in the direction in which the plants pass through the machine, since this prevents too great friction upon the plant, and at the same time carries it through the space between the belts J J and the belts L L. After the plant has passed the picking-burrs it is caught by the belting L L and passed between the rollers K K, and so out at the rear of the machine.

The belting L L may be made to move with a little greater rapidity than that of the machine over the ground, in order to carry away the plant from the picking-burrs. By this continuous motion of the two sets of belting and of the picking-burrs from front to rear the plants pass through the machine with very little friction.

The construction and operation of the picking-burrs are as follows: I form revolving pickers of, or cover them with, any suitable substance which entangles itself with and will seize the fibers of cotton projecting from the ripe bolls, but not with the leaves, stems, and unripe bolls of the plant, and thus draw out all the cotton from the ripe bolls without materially injuring the cotton or the plant. I have found that a very good material for this purpose is fine brass hair-wire, such as is known as "jewelers' wire," for matting brushes, and that the best form of picker is a cylindrical burr of this material with the projecting ends of the wires pointing in the direction in which the cylinder is intended to revolve, as shown in Fig. 2, F, and thus forming elastic hooks, each of which hooks should be so elastic that if standing by itself it would be bent backward upon coming into contact with the plant, so that its point would take no hold upon the cotton, but which hooks are so close together that as each bends backward upon entering the cotton it will be so supported by those behind it as to prevent the point from losing its hold.

Each picker may be composed of a series of cylindrical burrs, one above another, and with a small space between them for the guards or fences M. In such case the burrs upon one side of the channel-way should be placed opposite the fences or guards upon the other side, as shown in Fig. 4.

In place of the burrs of fine hair-wire the pickers may be composed of other suitable material, provided that the ends are curved or hooked or project from the burr in the direction of its motion, so that the points will act as elastic hooks to catch the cotton fiber.

The burr should be made to so revolve that its surface will have a motion but little faster than that of the plants in passing through the machine, so that the fibers of cotton become entangled by pressure of a multitude of small points, in distinction from being picked or knocked out by rapidly-revolving teeth, and also so that the plant will not be cut or filed by the points.

The cotton extracted from the bolls will cling to the revolving picking-burr and be carried to the cleaners, and thence into the bin.

Any suitable means may be used for cleaning the picking-burrs—such as scrapers, saws, combs, or brushes; but I have found the following method to be one of the simplest and most effective: Within the bin, and nearly in contact with the picker, is a pair of cylindrical cleaning-rollers, G H, which revolve in opposite directions, as shown by the arrows, so that the parts of said rollers in contact with each other move away from the picker, the fibers of cotton upon the picker being caught between these rollers and drawn away into the receiving-bin. The pressure of these rollers upon one another is regulated by the screws R and S at the top and bottom. One or both of these rollers may be covered with a thick coating or body of elastic material, such as india-rubber, so that large masses of cotton as well as small fibers can be caught and passed into the bin without injury to the cotton or strain upon the shafts of the rollers, and so that the parts of the rollers immediately above or below the place through which a mass of cotton is passing will remain in contact with one another.

I prefer to use one larger roller covered with elastic material and one smaller roller of polished steel, as shown in the drawings, Fig. 2, and lettered, respectively, G and H.

In place of the small steel roller a stationary plate or strip with a sharp straight edge may be used, the edge being inserted between the burr and the roller.

The guards N O prevent the cotton in the bin from coming in contact with the cleaning-rollers and the picker, and the scrapers Z Z prevent the cotton in the bin from winding around the shafts of the cleaning-rollers. Upon the ends of the guards are flaps of leather, or brushes, or combs, or saws, or scrapers, or other suitable devices, P Q, to prevent the cotton from adhering to the rollers, and thus being carried or wound round them. I prefer to use a soft substance at P in contact with the steel roller, and a metallic scraper or brush at Q in contact with the elastic roller, Fig. 5. The surface of the rollers may also be polished to prevent such adhesion.

At T T are doors, through which the cotton may be extracted from the bins. The bins may be open at the top, and upon the top of the machine may be placed a rack, $t$, the mechanism being incased, and thus the cotton will be forced up from below as it is delivered through the rollers until the rack is filled.

The side A in Fig. 2 shows the mechanism which I employ for conveying motion to the pickers and to the rollers which move the belting.

$b$ and $c$ are the cog-wheels which convey motion from the driving-wheels C and D, as shown more clearly in Figs. 3 and 4. They are so incased that the cotton in the bins and rack cannot touch them from the inside, nor can the plants beside which the machine is driven touch them from the outside. The casing is shown around the wheel D in Fig. 2. The machinery is the same on each side of the machine; but, for convenience, I show the operation of one side only.

Upon the driving-wheel C are cogs $h$, which impart motion to the wheel $c$ upon the shaft $d$. Upon the other end of the shaft $d$ is a beveled gear, $i$, which acts upon another beveled gear, $k$, in the inside of the hollow drum $l$, which drum is fixed upon the shaft of the cylindrical picker E. Upon the top of this drum, and in the same plane, is fastened a cog-wheel, $m$, geared into a smaller cog-wheel, $n$, keyed upon the upper end of the shaft of the roller G, Figs. 1, 2, and 4. Upon the ends of the rollers K and I, Fig. 1, are cylinders $p\ q$, in the same plane with the drum $l$ and covered with leather or rubber. Around these cylinders and the hollow drum passes the belting $r$, Fig. 2. Thus the motion of the drum $l$ will cause the belting-rollers to revolve by means of the belt $r$, and the cleaning-rollers to revolve by means of the cogs $m\ n$. The same motion may be imparted wholly by belts; but I prefer the mechanism above described.

This mechanism should be incased on all sides, so that the cotton in the bins and in the rack will not come in contact with it.

W, Fig. 1, is the seat of the driver on the spring $w'$. X, Fig. 1, is a lever for disconnecting the wheels C D from the shaft $d$ in any suitable manner. Upon the shaft $d$ may be a dog and ratchet or clutch, or any other suitable device to prevent the machine from acting when backed.

The machine may be drawn by one or more horses harnessed to the front part and walking in the furrows between the rows of plants, and for this purpose poles may be attached to the bins at the points $a$ and $e$.

The machine may be arranged with a revolving picker upon only one side of the channel-way V U, and the part of the machine upon the opposite side of the channel-way may be an endless belting, either straight or curved, or other suitable means for pressing the plants against the picker; or the machine may be made with more than one channel-way for the plants, and one or more pickers, together with their cleaning-rollers, may be connected with the same driving mechanism, so that two or more rows of plants may be picked simultaneously.

Previous to my invention card-clothing and curved wire teeth have been employed in cotton-harvesters, as have also rotary brushes; but neither of these show the peculiar construction of my picking-burrs, nor are they capable of acting in the same way.

Endless aprons have also been employed in corn-harvesters to grasp and carry the corn-stalks; but these only caught a portion of each stalk, and were not adapted, as mine are, to flatten out the whole plant like a fan, their function being simply to grasp and carry the cut stalks onto another apron, while mine are arranged to press the whole upper part of each plant and flatten it out for the operation of the picking-burrs.

I claim as my invention and desire to secure by Letters Patent—

1. In a machine for harvesting cotton having a converging channel-way for the passage of growing plants, endless belting upon rollers on each of the converging sides of said channel-way, and without picking-points upon its surface, so connected with the wheels upon which the machine moves that it will move backward through the machine at substantially the same rate as the passing plant, and so constructed and arranged as to present the entire upper part of the plant in a flattened condition to the action of the pickers, substantially as described.

2. In a cotton-harvester having a converging channel-way with anti-friction belting, constructed and arranged to present the entire upper part of the plant in a flattened condition, a picker located in the narrowest part of said channel-way and in the rear of said anti-friction belts, substantially as described.

3. In a cotton-harvester, the combination of two sets of belts lining the channel with the revolving picker, arranged in the space between the termination of the front set of belts and the commencement of the rear set, substantially as described.

4. In a cotton-harvester, a revolving picking-burr cylinder composed or covered with fine hair-wire, substantially such as described, in combination with a pair of cleaning-rollers, one or both covered with elastic material, substantially as described.

5. In a cotton-harvester, the combination, with the vertical picker, of the guards N O and the vertical stripper-rolls placed in the space between said guards, substantially as specified.

6. The picker E, for use in a cotton-harvester as a revolving picker, and having the body covered with elastic and mutually-supporting wire hooks whose points project in the direction of their revolution, constructed and operating substantially as set forth and described.

7. The picker E, constructed as described, in combination with the supporting-wheels C D and suitable intermediate gearing or mechanism arranged to revolve the picker at substantially the same speed as that at which it passes over the plants, and in the direction in which the hooks point, substantially as described and shown.

GERARD BEEKMAN.

Witnesses:
C. WYLLYS BETTS,
J. MINDON HYDE.